Sept. 24, 1929.         J. S. THOMPSON         1,729,140
FRICTION BRAKE
Filed Sept. 24, 1926

Inventor
James S. Thompson
By Wm O Bell Atty

Patented Sept. 24, 1929

1,729,140

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed September 24, 1926. Serial No. 137,416.

This invention relates to friction brakes and while it is particularly adapted for expanding brakes arranged to make frictional contact with a drum, which is a form of brake commonly employed in automotive vehicles, it is also useful in many other installations as will be apparent to those skilled in the art.

The object of the invention is primarily to provide novel means of simple construction which are adapted to be easily applied for securely holding a friction shoe in fixed position on the brake head.

And another object of the invention is to provide novel means for securing a friction shoe on a brake head which will not work loose or otherwise release the shoe under ordinary conditions of service.

In the accompanying drawings I have illustrated a selected embodiment of the invention and referring thereto:

Figure 1:
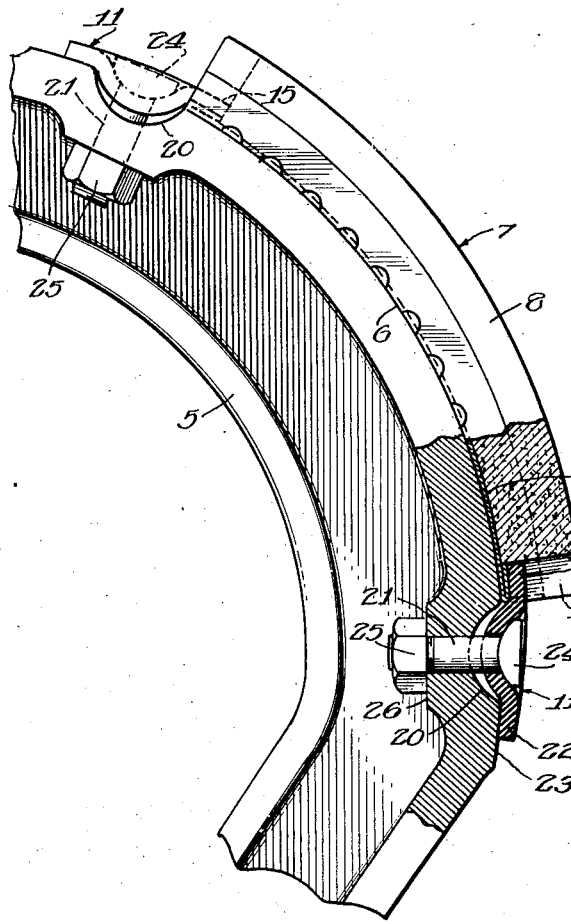
Fig. 1 is partly in section and shows that portion of a brake head on which the shoe is seated and secured by this invention.
Figure 2:
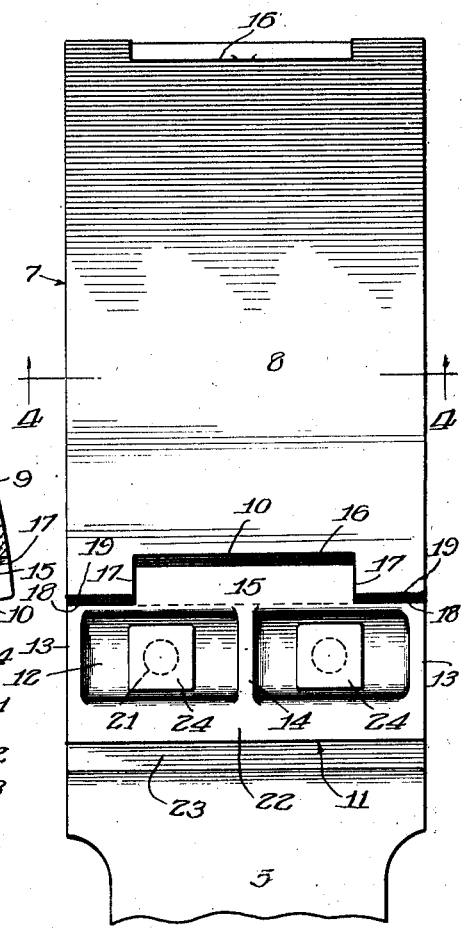
Fig. 2 is a plan view of Fig. 1.
Figure 3:
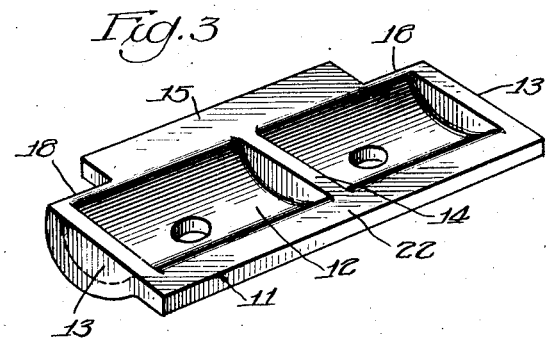
Fig. 3 is a perspective view of the fastening keeper.
Figure 4:
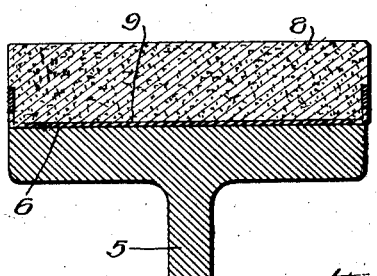
Fig. 4 is a sectional view on the line 4—4 of Fig. 2.

Referring to the drawings 5 is the brake head having a seat 6 for the shoe 7. I do not limit myself to any particular construction of these parts since it will be apparent that the invention may be employed with different heads and different shoes. For the purposes of this application I have shown a head having a seat 6 co-extensive with the back of the shoe, and I have shown a shoe having a composition body 8 and a metal back 9 attached thereto, the ends of the body being recessed at 10.

A keeper is engaged with each recessed end of the shoe and is fastened to the head for securing the shoe rigidly in place on its seat against movement in any direction. The keeper 11 is a casting having a longitudinal channel 12 closed at its ends by webs 13 and provided with an intermediate web 14. The keeper has a lug 15 to fit within the recess 10 of the shoe and it is preferably made to make an easy snug fit in the recess engaging the transverse back wall 16 and the end walls 17 of the recess. I also prefer to proportion the shoe and the keepers so that the shoulders 18 on the keepers will engage the end projections 19 on the shoe. The head is provided with transverse grooves 20 to receive the channeled portion of the keepers and bolts 21 pass through the grooved parts of the head and the channeled part of the keepers for securing the keepers rigidly to the head. The lug 15 on each keeper engages that part of the metal back 9 which is located in the recess 10, and this part of the back is preferably folded on itself, as shown in Fig. 1, to provide additional strength where the keeper engages the back. The edge of the keeper opposite the lug 15 is made in the form of a lip or flange 22 which engages the transverse shoulder 23 on the head, whereby the keeper is firmly seated with its lug clamping the metal back of the shoe against the seat on the head, and its lip or flange engaged with the transverse shoulder on the head, and the bolts passing through the channel part of the keeper and the grooved part of the head. The head 24 of each bolt is rounded on its under side to fit the channel in the keeper, and the head is preferably rectangular in shape so that it will engage the curved wall forming the channel of the keeper and be prevented from turning. The nut 25 for each bolt engages a flat shoulder 26 on the head, and a suitable washer may be provided whenever desired.

The invention provides a keeper of simple construction which can be easily and accurately made, which does not require machining to any material extent, if at all, and which is adapted to be securely fastened to the head to hold the shoe in rigid position on the seat against movement in any direction. The channeled or rounded part of the keeper has a bottom face described on an arc of greater degree than that of the groove in the head so that there will be a clearance between the bottom of the groove and the keeper which will permit the keeper to yield slightly when the nuts are tightly adjusted on the bolts, whereby the keepers will securely and rigidly hold the shoe on the head, and the nuts are more securely held on the bolts.

The lugs engage the metal back of the shoe to hold it on its seat against any tendency to move outward, but I do not rely upon engagement of the lugs with the metal back to prevent lateral or longitudinal movement of the shoe on its seat. The parts are preferably made so that the lugs will engage the back and the end walls of the recesses, and the shoulders 18 on the keepers will engage the end projections 19 on the shoe, to prevent lateral and longitudinal movement of the shoe on its seat. But, if found desirable, the lugs may be made so that they will not engage the back wall of the recesses, and the shoulders 18 engaging the end projections 19 may be relied upon to prevent endwise movement of the shoe on its seat; or this endwise movement may be prevented by engagement of the lugs with the back wall of the recess and without providing definitely for engagement of the shoulders 18 with the end projections 19. I prefer to make the parts so that the lug will engage the back and end walls of the recess and the shoulders 18 will engage the end projections 19. The end webs 13 and the intermediate web 14 are provided to strengthen the keeper, but in some embodiments of the invention these webs, or any of them, may be omitted, or more webs may be used if found desirable for greater strength.

My invention can be embodied in various forms in brake assemblies of many kinds for different installations, and it can be embodied with different shoes and with different heads, and I reserve the right to make all modifications and adaptations of the invention that may be covered by the following claims.

I claim:

1. A keeper for securing a friction shoe to a brake head and having a channeled part with a bolt opening therein, and a lateral projection for engaging the shoe.

2. A keeper for securing a friction shoe to a brake head and having a lug on one side, a lip on the opposite side, and a channeled part intermediate of the lug and lip.

3. A keeper for securing a friction shoe to a brake head and having a channeled part, a lateral projection for engaging the shoe, and a web bridging said channeled part to reenforce and strengthen the same.

4. A keeper for securing a friction shoe to a brake head and having a channeled part, a lateral projection for engaging the shoe, and webs at the ends and between the ends of said channeled part.

5. The combination of a brake head having a shoe seat thereon and a transverse groove at an end of the seat, a shoe engaging the seat, a keeper in the groove and projecting beyond the groove and engaging the shoe, and a bolt passing through the grooved part of the head and the keeper for securing the keeper to the head.

6. The combination of a brake head having a shoe seat thereon and a transverse groove at an end of the seat, a shoe engaging the seat, a keeper bridging the groove in the head and engaging the shoe, and a bolt passing through the grooved part of the head and the keeper for securing the keeper to the head.

7. The combination of a brake head having a shoe seat thereon and a transverse groove at an end of the seat, a shoe engaging the seat, a keeper engaging the shoe and bridging the groove in the head, said keeper having a rounded part, and a bolt passing through the grooved part of the head and the rounded part of the keeper for securing the keeper to the head.

8. The combination of a brake head having a shoe seat thereon and a transverse groove at an end of the seat, a shoe engaging the seat, a keeper engaging the shoe and bridging the groove in the head, said keeper having a channeled part to enter said groove and transverse webs in said channeled part, and a bolt passing through the grooved part of the head and the channeled part of the keeper for securing the keeper to the head.

9. The combination of a brake head having a shoe seat thereon and a transverse groove at an end of the seat, a shoe engaging the seat, a keeper engaging the shoe and bridging the groove in the head, said keeper having a channeled part to enter said groove and transverse webs at the ends and between the ends of said channeled part, and a bolt passing through the grooved part of the head and the channeled part of the keeper for securing the keeper to the head.

10. The combination of a brake head having a shoe seat thereon and a transverse groove at an end of the seat, a shoe engaging the seat, a keeper bridging the groove in the head and having a lug engaging the shoe at one side of the groove and a lip engaging the head at the other side of the groove, and a bolt passing through the grooved part of the head and engaging the keeper for securing the keeper to the head.

11. The combination of a brake head having a shoe seat thereon and a transverse groove at an end of the seat, a shoe engaging the seat, a keeper bridging the groove in the head and having a lug engaging the shoe at one side of the groove and a lip engaging the head at the other side of the groove, said keeper having a rounded part between the lug and the lip, and a bolt passing through the grooved part of the head and the rounded part of the keeper for securing the keeper to the head.

12. The combination of a brake head having a shoe seat thereon and a transverse groove at an end of the seat, a shoe engaging the seat, a keeper engaging the shoe and bridging the groove in the head, said keeper having a rounded part arranged in the groove in the head, there being a clearance between the bottom of the groove and the rounded part of the keeper, and a bolt passing through the grooved part of the head and the rounded part of the keeper for securing the keeper to the head.

13. The combination of a brake head having a shoe seat thereon and a transverse groove at an end of the seat, a shoe engaging the seat, a keeper having a lug engaging the shoe and a lip engaging the head, the keeper being rounded between the lug and the lip and arranged in the groove in the head, there being a clearance between the bottom of the groove and the rounded part of the keeper, and a bolt passing through the grooved part of the head and the rounded part of the keeper for securing the keeper to the head.

14. The combination of a brake head having a shoe seat thereon and a transverse groove at an end of the seat, a shoe engaging the seat, said shoe comprising a body having a recess in its end and a metal back on said body, a keeper having a lug fitting in said recess to engage the back and end walls thereof and having shoulders at the ends of the lug engaging end projections on the shoe at the ends of the recess, said keeper having a rounded part to enter the groove in the head, and a bolt engaging said grooved part of the head and rounded part of the keeper for securing the keeper to the head.

15. The combination of a brake head having a shoe seat thereon and a transverse groove at an end of the seat, a shoe engaging the seat, a keeper engaging the shoe and bridging the groove in the head, said keeper having a channeled part arranged in said groove, and a bolt passing through the grooved part of the head and the channeled part of the keeper for securing the keeper to the head, the head of the bolt being shaped to fit in the channel of the keeper.

JAMES S. THOMPSON.